(12) United States Patent
Uemura

(10) Patent No.: US 7,775,109 B2
(45) Date of Patent: Aug. 17, 2010

(54) SENSOR DEVICE

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/615,848

(22) Filed: Nov. 10, 2009

(65) Prior Publication Data

US 2010/0083757 A1    Apr. 8, 2010

Related U.S. Application Data

(63) Continuation of application No. 12/486,227, filed on Jun. 17, 2009, which is a continuation of application No. PCT/JP2009/001524, filed on Apr. 1, 2009.

(30) Foreign Application Priority Data

Apr. 4, 2008   (JP)   ............................. 2008-097919
Oct. 16, 2008  (JP)   ............................. 2008-267024

(51) Int. Cl.
    *G01P 3/44* (2006.01)
(52) U.S. Cl. ................ 73/504.12; 73/514.01
(58) Field of Classification Search ............. 73/504.12, 73/514.01, 488; 385/18; 310/365
    See application file for complete search history.

(56) References Cited

U.S. PATENT DOCUMENTS

| | | | |
|---|---|---|---|
| 5,512,890 A | 4/1996 | Everson, Jr. et al. | |
| 5,734,087 A | 3/1998 | Yamashita | |
| 5,939,630 A | 8/1999 | Nozoe et al. | |
| 6,089,091 A | 7/2000 | Nozoe et al. | |
| 6,229,402 B1 * | 5/2001 | Kataoka et al. | ............... 331/34 |
| 6,244,095 B1 | 6/2001 | Nozoe et al. | |
| 6,422,088 B1 | 7/2002 | Oba et al. | |
| 6,497,146 B1 | 12/2002 | Hobbs et al. | |
| 6,912,901 B1 | 7/2005 | Nozoe et al. | |
| 7,008,525 B2 | 3/2006 | Morita et al. | |
| 7,083,712 B2 * | 8/2006 | Morita et al. | ............... 205/775 |
| 7,185,532 B2 * | 3/2007 | Giustino et al. | ............... 73/146 |

(Continued)

FOREIGN PATENT DOCUMENTS

EP        0689055 A1    12/1995

(Continued)

OTHER PUBLICATIONS

Notice of Reasons for Rejection mailed on Dec. 16, 2008 for Japanese Patent Application No. JP2008-267024.

(Continued)

*Primary Examiner*—Hezron Williams
*Assistant Examiner*—Samir M Shah
(74) *Attorney, Agent, or Firm*—Panasonic Patent Center; Dhiren Odedra; Kerry Culpepper

(57) ABSTRACT

A sensor device includes a time determining part that determines time point information, and adds the time point information to the output supplied from a part subjected to failure diagnosis and related to generation of a failure detection signal, and to the output related to generation of a sense signal. With this structure, the failure detection signal is correlated with the sense signal by the time point information. Alternatively, the sensor device includes an output circuit that correlates the failure detection signal with the sense signal supplied at the same time point as the failure detection signal, and outputs both signals using a time division method.

4 Claims, 9 Drawing Sheets

U.S. PATENT DOCUMENTS

| | | | |
|---|---|---|---|
| 7,212,953 B1 * | 5/2007 | Artiuch | 702/183 |
| 7,275,009 B2 * | 9/2007 | Yasukawa et al. | 702/115 |
| 7,324,909 B2 * | 1/2008 | Yasukawa et al. | 702/115 |
| 7,463,798 B2 * | 12/2008 | Yoshida | 385/18 |
| 2005/0000829 A1 * | 1/2005 | Morita et al. | 205/775 |
| 2006/0222291 A1 * | 10/2006 | Yoshida | 385/18 |
| 2008/0216567 A1 * | 9/2008 | Breed | 73/146.5 |
| 2008/0236264 A1 * | 10/2008 | Sato et al. | 73/114.18 |
| 2009/0031807 A1 | 2/2009 | Sugibayashi | |

FOREIGN PATENT DOCUMENTS

| | | |
|---|---|---|
| EP | 1087219 A2 | 3/2001 |
| EP | 1087219 A3 | 3/2001 |
| EP | 1455182 A1 | 9/2004 |
| JP | 57-159302 A | 10/1982 |
| JP | 06-098382 | 4/1994 |
| JP | 08-327363 | 12/1996 |
| JP | 09-044798 | 2/1997 |
| JP | 2001-074503 | 3/2001 |
| JP | 2002-174521 | 6/2002 |
| JP | 2004-023279 | 1/2004 |
| JP | 2004-264074 | 9/2004 |
| JP | 2005-331332 | 12/2005 |
| JP | 2007-285747 | 11/2007 |
| JP | 2008-002890 | 1/2008 |
| WO | 2007/129494 A1 | 11/2007 |

OTHER PUBLICATIONS

Office Action issued on Aug. 28, 2009 for the corresponding GB Patent application No. GB0911551.0.

International Search Report of PCT Application No. PCT/JP2009/001524 dated Apr. 28, 2009.

JPO Office Action issued on May 27, 2008 for the corresponding priority Japanese Patent Application No. 2008-097919.

JPO Office Action issued on Feb. 10, 2009 for the corresponding priority Japanese Patent Application No. 2008-097919.

JPO Office Action issued on Dec. 16, 2008 for the corresponding priority Japanese Patent Application No. 2008-267024.

JPO Decision to Grant a Patent issued on Apr. 21, 2009 for the corresponding priority Japanese Patent Application No. 2008-097919.

JPO Decision to Grant a Patent issued on Mar. 10, 2009 for the corresponding priority Japanese Patent Application No. 2008-267024.

* cited by examiner

FIG. 2

| $t_{01}$ | $r_{011}$ | $r_{012}$ | ... | $r_{016}$ | $r_{017}$ | $r_{018}$ |
| --- | --- | --- | --- | --- | --- | --- |
| $t_{02}$ | $r_{021}$ | $r_{022}$ | ... | $r_{026}$ | $r_{027}$ | $r_{028}$ |
| $t_{03}$ | $r_{031}$ | $r_{032}$ | ... | $r_{036}$ | $r_{037}$ | $r_{038}$ |
| $t_{04}$ | $r_{041}$ | $r_{042}$ | ... | $r_{046}$ | $r_{047}$ | $r_{048}$ |

⋮

| $t_{96}$ | $r_{961}$ | $r_{962}$ | ... | $r_{966}$ | $r_{967}$ | $r_{968}$ |
| --- | --- | --- | --- | --- | --- | --- |
| $t_{97}$ | $r_{971}$ | $r_{972}$ | ... | $r_{976}$ | $r_{977}$ | $r_{978}$ |
| $t_{98}$ | $r_{981}$ | $r_{982}$ | ... | $r_{986}$ | $r_{987}$ | $r_{988}$ |
| $t_{99}$ | $r_{991}$ | $r_{992}$ | ... | $r_{996}$ | $r_{997}$ | $r_{998}$ |

FIG. 3

| $t_{01}$ | $f_{011}$ | $f_{012}$ | | $f_{016}$ | $f_{017}$ | $f_{018}$ |
|---|---|---|---|---|---|---|
| $t_{02}$ | $f_{021}$ | $f_{022}$ | | $f_{026}$ | $f_{027}$ | $f_{028}$ |
| $t_{03}$ | $f_{031}$ | $f_{032}$ | | $f_{036}$ | $f_{037}$ | $f_{038}$ |
| $t_{04}$ | $f_{041}$ | $f_{042}$ | | $f_{046}$ | $f_{047}$ | $f_{048}$ |
| $t_{96}$ | $f_{961}$ | $f_{962}$ | | $f_{966}$ | $f_{967}$ | $f_{968}$ |
| $t_{97}$ | $f_{971}$ | $f_{972}$ | | $f_{976}$ | $f_{977}$ | $f_{978}$ |
| $t_{98}$ | $f_{981}$ | $f_{982}$ | | $f_{986}$ | $f_{987}$ | $f_{988}$ |
| $t_{99}$ | $f_{991}$ | $f_{992}$ | | $f_{996}$ | $f_{997}$ | $f_{998}$ |

SENSOR DEVICE

BACKGROUND OF THE INVENTION

1. Field of the Invention

The present invention relates to a sensor device for use in a vehicle, various types of electronic devices, or the like.

2. Background Art

FIG. 9 is a block diagram of an inertial sensor, which is an example of a conventional sensor device. This sensor device includes driving circuits 1A and 1B, sensing element 2, detecting circuits 3A and 3B, processing circuits 4A and 4B, output circuits 5A and 5B, and failure diagnosing circuit 6. Each of driving circuits 1A and 1B outputs a drive signal. Driving circuits 1A and 1B supplies the drive signals to sensing element 2. Sensing element 2 includes an angular velocity detector and an acceleration detector. Each of detecting circuits 3A and 3B extracts a response signal from sensing element 2. Processing circuits 4A and 4B extract sense signals from the response signals extracted from detecting circuits 3A and 3B, respectively. Output circuits 5A and 5B output the sense signals extracted from processing circuits 4A and 4B, respectively. Failure diagnosing circuit 6 determines whether a part subjected to failure diagnosis is normal or abnormal, and outputs a failure detection signal that is based on the results. At least one of detecting circuits 3A and 3B, processing circuits 4A and 4B, and output circuits 5A and 5B is the part subjected to failure diagnosis. Patent Document 1 is known as the document information on a conventional art related to this application, for example.

However, such a conventional sensor device has a problem in improving the reliability thereof. In the above structure, the sense signal is not temporally correlated with the failure detection signal. Thus, the output sense signal cannot be determined precisely in an instant to be a signal in a normal state or a signal at the time of failure. Therefore, it is likely that an object to be controlled according to the output of this sensor device, such as a vehicle, is controlled using a sense signal at the time of failure.

Patent Document 1: Japanese Patent Unexamined Publication No. H08-327363

SUMMARY OF THE INVENTION

The present invention provides a sensor device having improved reliability. The sensor device includes a time determining part that determines time point information, and adds the time point information to the output that is supplied from a part subjected to failure diagnosis and is related to generation of a failure detection signal, and to the output that is related to generation of a sense signal. With this structure, the failure detection signal is correlated with the sense signal by the time point information. Alternatively, the sensor device includes an output circuit that correlates a failure detection signal with a sense signal supplied at the same time point as the failure detection signal, and outputs both signals using a time division method.

Either of these structures allows the failure detection signal to be temporally correlated with the sense signal. Thus, the supplied sense signal can be precisely determined to be a signal in a normal state or a signal at the time of failure. As a result, the reliability of control based on the sense signal can be improved.

BRIEF DESCRIPTION OF THE DRAWINGS

FIG. 2 is a chart showing response signals to which time point information is added, in the sensor device of FIG. 1.

FIG. 3 is a chart showing failure detection signals to which the time point information is added, in the sensor device of FIG. 1.

DETAILED DESCRIPTION OF PREFERRED EMBODIMENTS

First Exemplary Embodiment

Figure 1:
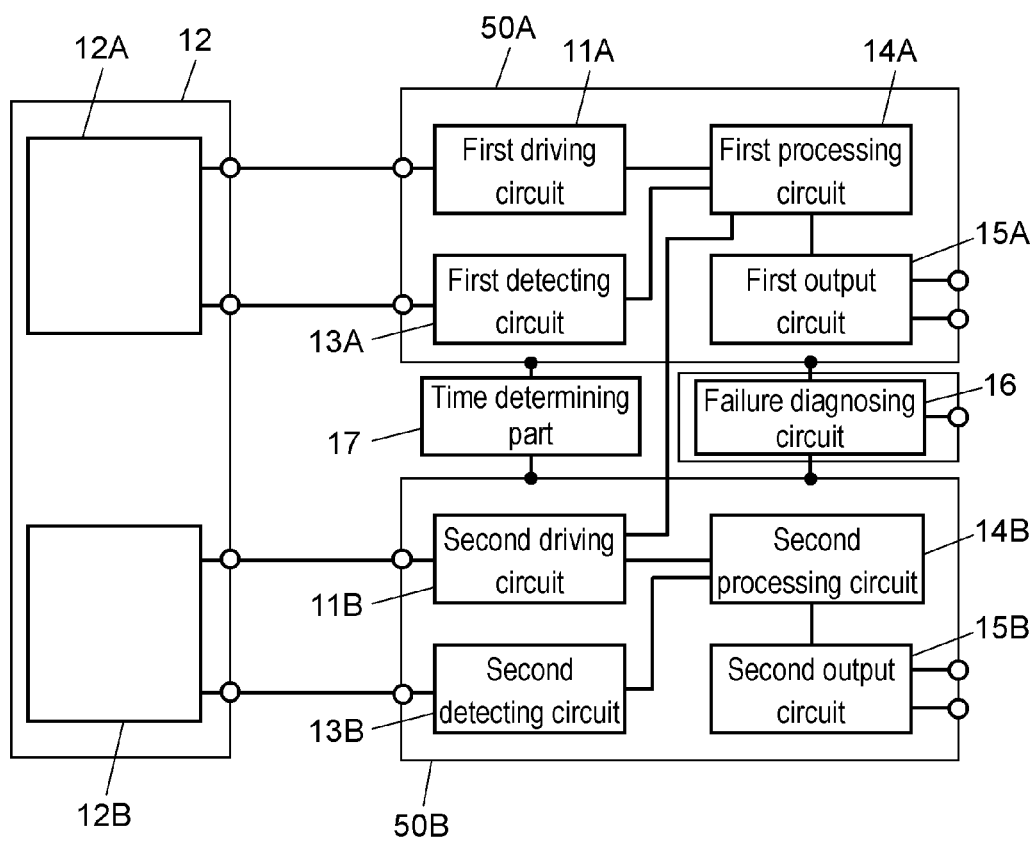
FIG. 1 is a block diagram of a sensor device in accordance with a first exemplary embodiment of the present invention.

FIG. 1 is a block diagram of a sensor device in accordance with a first exemplary embodiment of the present invention. The sensor device of this exemplary embodiment includes first control circuit 50A, second control circuit 50B, sensing element part 12, failure diagnosing circuit 16, and time determining part 17. First control circuit 50A includes first driving circuit (hereinafter "driving circuit") 11A, first detecting circuit (hereinafter "detecting circuit") 13A, first processing circuit (hereinafter "processing circuit") 14A, and first output circuit (hereinafter "output circuit") 15A. Similarly, second control circuit 50B includes second driving circuit (hereinafter "driving circuit") 11B, second detecting circuit (hereinafter "detecting circuit") 13B, second processing circuit (hereinafter "processing circuit") 14B, and second output circuit (hereinafter "output circuit") 15B.

Each of driving circuits 11A and 11B outputs a drive signal. The drive signal from driving circuit 11A is supplied to angular velocity sensing element 12A, i.e. a first sensing element of sensing element part 12. The drive signal from driving circuit 11B is supplied to acceleration sensing element 12B, i.e. a second sensing element of sensing element part 12. Each of detecting circuits 13A and 13B extracts a response signal from sensing element part 12. Processing circuits 14A and 14B extract first and second sense signals from the response signals extracted from detecting circuits 13A and 13B, respectively. Processing circuits 14A and 14B may extract first and second monitor signals at the same time. Output circuits 15A and 15B output the sense signals extracted from processing circuits 14A and 14B, respectively. Failure diagnosing circuit 16 determines whether a part subjected to failure diagnosis is normal or abnormal, and outputs a failure detection signal that is based on the results. At least one of detecting circuits 13A and 13B, processing circuits 14A and 14B, and output circuits 15A and 15B is the part subjected to failure diagnosis.

In the case that processing circuits 14A and 14B extract monitor signals, driving circuit 11A can adjust the vibration amplitude of the first drive signal, according to the first monitor signal from processing circuit 14A. Similarly, driving circuit 11B can adjust the vibration amplitude of the second drive signal, according to the second monitor signal from processing circuit 14B.

Time determining part 17 determines time point information and adds this time point information to the output from the part subjected to failure diagnosis, thereby correlates the failure detection signal with the sense signal, using the time point information.

As an example, a case where detecting circuits 13A and 13B are parts subjected to failure diagnosis is described with reference to FIGS. 1 through 3. FIG. 2 is a chart showing response signals to which time point information is added, in the sensor device of FIG. 1. FIG. 3 is a chart showing failure detection signals to which time point information is added, in the sensor device.

First, time determining part 17 is electrically connected to detecting circuits 13A and 13B. Thus, time determining part 17 transmits the determined time point information to detecting circuits 13A and 13B. As shown in FIG. 2, when response signals (r011 through r998) are supplied from detecting circuits 13A and 13B, time point information (t01 through t99) is added to the response signals. The response signals (r011 through r998) to which the time point information (t01 through t99) is added are supplied as sense signals from output circuits 15A and 15B, via processing circuits 14A and 14B, respectively. Also at this time, the time point information (t01 through t99) is added to the sense signals.

On the other hand, failure diagnosing circuit 16 determines whether detecting circuits 13A and 13B, i.e. the parts subjected to failure diagnosis, are normal or abnormal. Failure diagnosing circuit 16 outputs a failure detection signal that is based on the results. When detecting circuits 13A and 13B output information on failure detection to failure diagnosing circuit 16, the time point information (t01 through t99) that is the same as the time point information of the response signals (r011 through r998) described above is also added to the output. Thus, when failure diagnosing circuit 16 generates failure detection signals (f011 through f998) based on the information on failure detection and outputs the generated signals, the time point information (t01 through t99) is added to the failure detection signals (f011 through f998), as shown in FIG. 3.

With such a structure, the failure detection signals (f011 through f998) can be temporally correlated with the sense signals, using the time point information (t01 through t99). That is, time determining part 17 adds time point information to the output that is supplied from a part subjected to failure diagnosis and is related to generation of a failure detection signal, and to the output that is related to generation of a sense signal. Thus, the failure detection signal is correlated with the sense signal, by the time point information. Therefore, the supplied sense signal can be precisely determined to be a signal in a normal state or a signal at the time of failure. As a result, the possibility that an object to be controlled according to the output of the sensor device, such as a vehicle, is controlled using a sense signal at the time of failure can be reduced. Thus, the reliability is improved.

In this exemplary embodiment, sensing element part 12 is formed of two sensing elements, i.e. angular velocity sensing element 12A and acceleration sensing element 12B. Further, a description is provided of a structure where driving circuits 11A and 11B, detecting circuits 13A and 13B, and processing circuits 14A and 14B are provided as a circuit configuration corresponding to the above two sensing elements. However, the number of sensing elements may be one, and one driving circuit, one detecting circuit, and one processing circuit may be provided as a circuit configuration corresponding to the one sensing element.

In this exemplary embodiment, a description is provided of an example where parts subjected to failure diagnosis are detecting circuits 13A and 13B, which are parts identical with each other in an angular velocity sensing system and an acceleration sensing system. However, the present invention is not limited to this structure. For example, a first part subjected to failure diagnosis may be output circuit 15A and a second part subjected to failure diagnosis may be processing circuit 14B. Such a structure where the two parts subjected to failure diagnosis are not identical with each other in the angular velocity sensing system and the acceleration sensing system can be used. In this case, first time point information common to both of a sense signal from output circuit 15A and information on failure detection supplied to failure diagnosing circuit 16 by output circuit 15A needs to be added to the sense signal and the information on failure detection. On the other hand, second time point information common to both of a sense signal from processing circuit 14B and information on failure detection supplied to failure diagnosing circuit 16 by processing circuit 14B needs to be added to the sense signal and the information on failure detection.

In this exemplary embodiment, one part in each of the angular velocity sensing system and the acceleration sensing system is a part subjected to failure diagnosis. However, failure diagnosing circuit 16 may work on a plurality of parts subjected to failure diagnosis. Specifically, failure diagnosing circuit 16 can be electrically connected to all the circuits of detecting circuit 13A and 13B, processing circuits 14A and 14B, and output circuits 15A and 15B, for example, so that a failure detection signal can be supplied from each circuit. With this structure, a failure that cannot be detected by failure diagnosis in one part subjected to failure diagnosis can be detected by failure diagnosis in a plurality of parts subjected to failure diagnosis. Thus, the precision of failure detection can be improved.

In this exemplary embodiment, angular velocity sensing element 12A and acceleration sensing element 12B are used for explanation. However, the present invention can be implemented for other various types of sensor device, such as a pressure sensor, and a temperature sensor.

It is preferable that each of output circuits 15A and 15B does not output a sense signal that has time point information at the same time point as the time point information of the failure detection signal when failure diagnosing circuit 16 outputs a failure detection signal indicating that a part subjected to failure diagnosis is abnormal. That is, when each of output circuits 15A and 15B receives a sense signal that has time point information at the same time point as the time point information of the failure detection signal, output circuits 15A and 15B prohibit output circuits 15A and 15B themselves from outputting the sense signals. Alternatively, a controller, which is not shown, may be provided so that the controller prohibits output circuits 15A and 15B from outputting the sense signals. Alternatively, output circuits 15A and 15B may output signals at a level at which the output signals cannot be detected by an object to be controlled, such as a vehicle, or the above controller may cause output circuits 15A and 15B to output signals at such a level. The methods are not limited as long as output circuits 15A and 15B substantially output no sense signal.

With this control, the object to be controlled, such as a vehicle, does not need to determine, according to a failure detection signal supplied from the sensor device, whether or not to use the sense signals correlated with the failure detection signal. That is, the object can be prevented from being controlled using the sense signals correlated with the failure detection signal.

In a specific structure, an output-circuit control circuit (not shown) is provided so as to be electrically connected to failure diagnosing circuit 16. Alternatively, an output-circuit control circuit is provided in failure diagnosing circuit 16, or in each of output circuits 15A and 15B. The output-circuit control circuit determines whether or not failure diagnosing circuit 16 has supplied a failure detection signal that indicates abnormality in a part subjected to failure diagnosis. When the output-circuit control circuit determines that a failure detection signal is supplied, the output-circuit control circuit prohibits output circuits 15A and 15B from outputting the sense signals that has the time point information at the same time point as the time point information of the failure detection signal. In this manner, this structure can prevent outputting of the sense signals that have the time point information at the same time point as the time point information of the failure detection signal.

Figure 4:
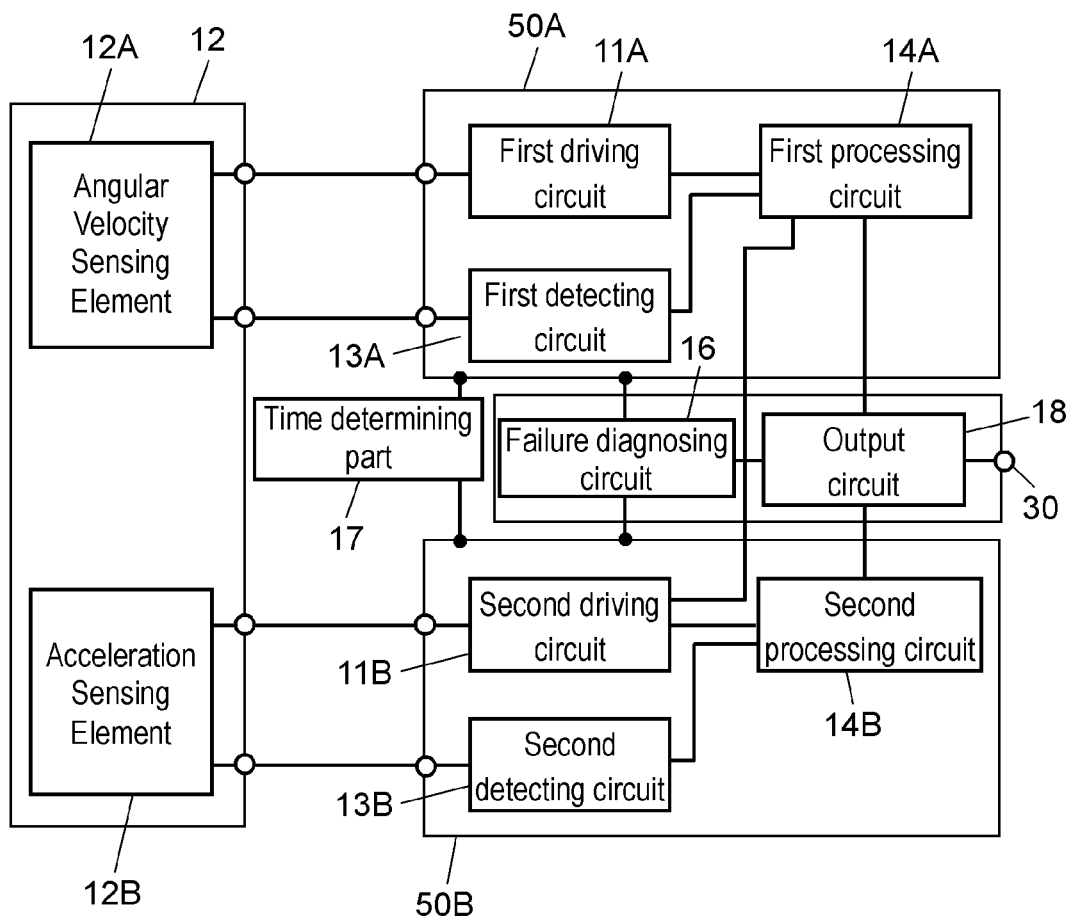
FIG. 4 is a block diagram of another sensor device in accordance with the first exemplary embodiment of the present invention.

Next, a description is provided of another example of the sensor device of this exemplary embodiment, with reference to FIG. 4. FIG. 4 is a block diagram of another sensor device in accordance with this exemplary embodiment. In this structure, output circuit 18 that outputs first and second sense signals from processing circuits 14A and 14B, respectively, and outputs a failure detection signal from failure diagnosing circuit 16 is shared among the above circuits. Output circuit 18 digitally outputs the sense signals and the failure detection signal, using a time division method. With such a structure, the number of terminals 30 and thus the size of the sensor device can be reduced.

Using a time division method, output circuit 18 couples and outputs the first and second sense signals and the failure detection signal that are correlated with each other by time point information. Thus, on the side of an object to be controlled, the process of coupling the sense signals and the failure detection signals correlated with each other by the time point information can be omitted. Therefore, this structure is preferable.

Also in the structure shown in FIG. 4, it is preferable that when failure diagnosing circuit 16 outputs a failure detection signal indicating that a part subjected to failure diagnosis is abnormal, output circuit 18 does not output a sense signal that has time point information at the same time point as the time point information of the failure detection signal. With this control, the object to be controlled does not need to determine, according to a failure detection signal supplied from the sensor device, whether or not to use the sense signals correlated with the failure detection signal. That is, the object can be prevented from being controlled, using the sense signals correlated with the failure detection signal.

In a specific structure, an output-circuit control circuit (not shown) is provided so as to be electrically connected to failure diagnosing circuit 16. Alternatively, an output-circuit control circuit is provided in failure diagnosing circuit 16, or in output circuit 18. The output-circuit control circuit determines whether or not failure diagnosing circuit 16 has supplied a failure detection signal that indicates abnormality in a part subjected to failure diagnosis. When the output-circuit control circuit determines that a failure detection signal has been supplied, the output-circuit control circuit prohibits output circuit 18 from outputting the sense signals that have the time point information at the same time point as the time point information of the failure detection signal. In this manner, this structure can prevent outputting of the sense signals that have the time point information at the same time point as the time point information of the failure detection signal.

Also in the structure shown in FIG. 4, one part in each of the angular velocity sensing system and the acceleration sensing system may be set as a part subjected to failure diagnosis. Alternatively, a structure including a plurality of parts subjected to failure diagnosis can be used. In a structure including a plurality of parts subjected to failure diagnosis, a failure that cannot be detected by failure diagnosis in one part subjected to failure diagnosis can be detected by failure diagnosis in a plurality of parts subjected to failure diagnosis. Thus, the precision of failure detection can be improved.

In this exemplary embodiment, each of the parts subjected to failure diagnosis needs to be a digital circuit, because time point information needs to be added. For this reason, driving circuits 11A and 11B are not included in the parts subjected to failure diagnosis. Further, in the structure of FIG. 4, failure diagnosing circuit 16 is upstream of output circuit 18. Thus, when output circuit 18 fails, the output of the sense signals in an abnormal state cannot be determined whether the output is supplied in an abnormal state or in a normal state. Therefore, in the structure of FIG. 4, output circuit 18 is not included in the parts subjected to failure diagnosis.

Second Exemplary Embodiment

Figure 5:
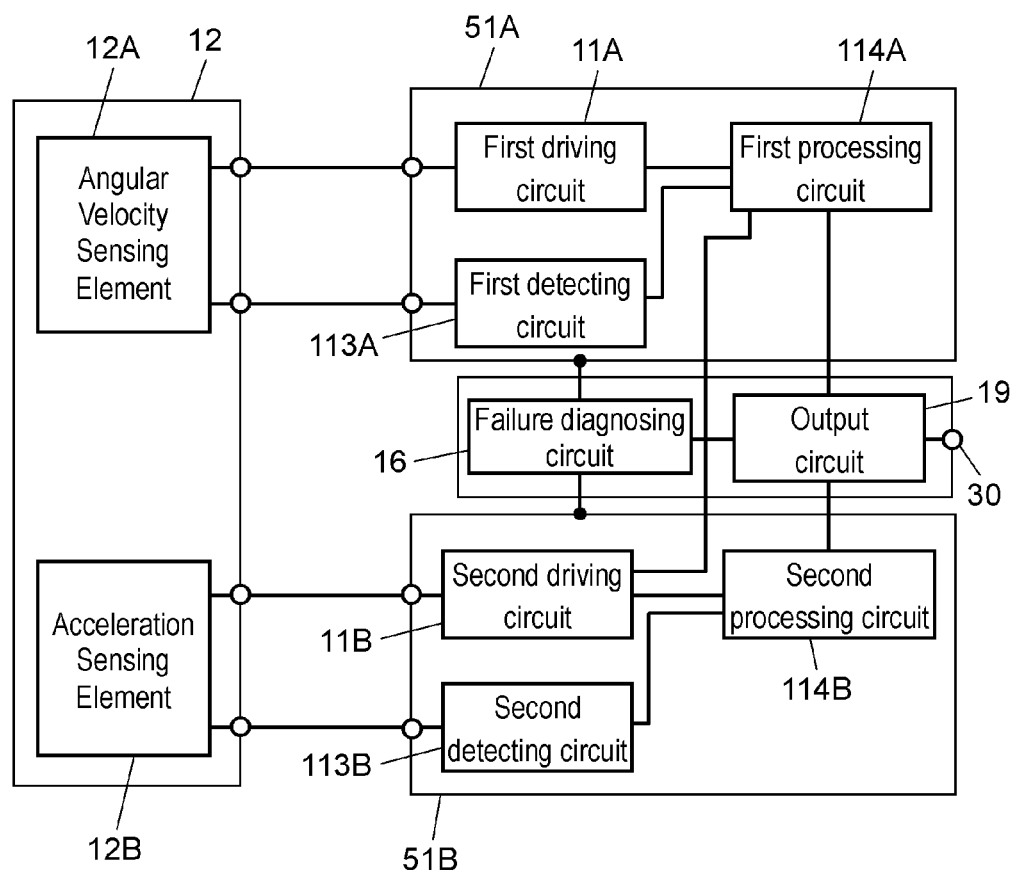
FIG. 5 is a block diagram of a sensor device in accordance with a second exemplary embodiment of the present invention.

FIG. 5 is a block diagram of a sensor device in accordance with a second exemplary embodiment of the present invention. The sensor device of this exemplary embodiment is different from the structure shown in FIG. 4 in that the sensor device has first control circuit 51A and second control circuit 51B instead of first control circuit 50A and second control circuit 50B, and has no time determining part 17. Further, the sensor device has output circuit 19 instead of output circuit 18. The other elements of the structure in this exemplary embodiment are similar to those in the first exemplary embodiment, and the descriptions of those elements are omitted.

First control circuit 51A includes first driving circuit (hereinafter "driving circuit") 11A, first detecting circuit (hereinafter "detecting circuit") 113A, and first processing circuit (hereinafter "processing circuit") 114A. Second control circuit 51B includes second driving circuit (hereinafter "driving circuit") 11B, second detecting circuit (hereinafter "detecting circuit") 113B, and second processing circuit (hereinafter "processing circuit") 114B.

Detecting circuit 113A extracts a first response signal from angular velocity sensing element 12A. Detecting circuit 113B extracts a second response signal from acceleration sensing element 12B. The first response signal from detecting circuit 113A is supplied to processing circuit 114A. Processing circuit 114A extracts a first sense signal from the first response signal. At the same time, processing circuit 114A may extract a first monitor signal. The second response signal from detecting circuit 113B is supplied to processing circuit 114B. Processing circuit 114B extracts a second sense signal from the second response signal. At the same time, processing circuit 114B may extract a second monitor signal.

When processing circuits 114A and 114B extract monitor signals, driving circuit 11A can adjust the vibration amplitude of the first drive signal, according to the first monitor signal from processing circuit 114A. Similarly, driving circuit 11B can adjust the vibration amplitude of the second drive signal, according to the second monitor signal from processing circuit 114B.

Failure diagnosing circuit 16 is electrically connected to at least one of driving circuit 11A, detecting circuit 113A, and processing circuit 114A. Failure diagnosing circuit 16 is also electrically connected to at least one of driving circuit 11B, detecting circuit 113B, and processing circuit 114B. That is, at least one of driving circuit 11A, detecting circuit 113A, and processing circuit 114A is a first part subjected to failure diagnosis. At least one of driving circuit 11B, detecting circuit 113B, and processing circuit 114B is a second part subjected to failure diagnosis. Output circuit 19 digitally outputs a failure detection signal from failure diagnosing circuit 16, and the first and second sense signals from processing circuits 114A and 114B, respectively, using a time division method.

Figure 6:
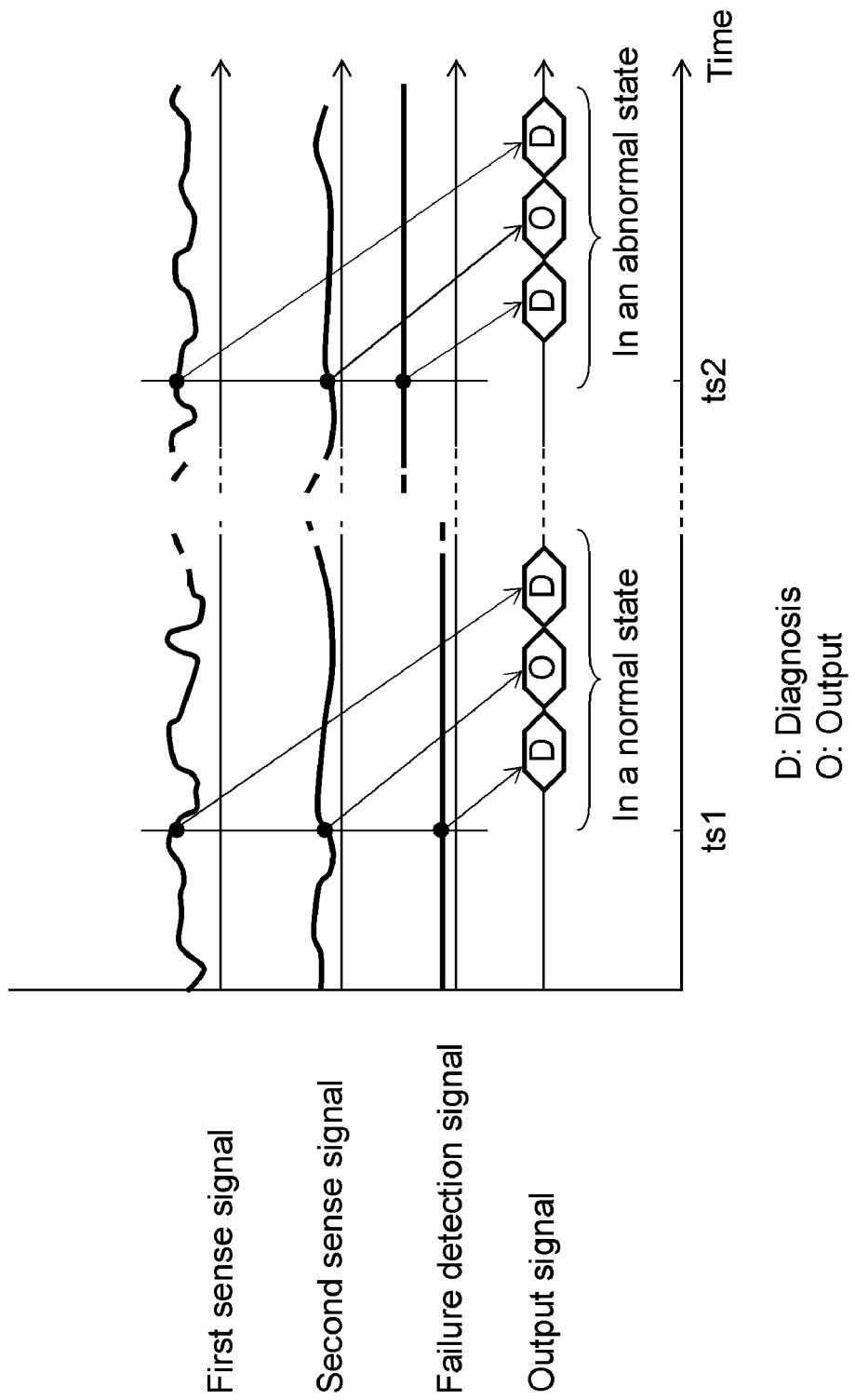
FIG. 6 is a chart showing changes in output signals in the sensor device of FIG. 5.

FIG. 6 is a chart showing a state of digital output from output circuit 19. The first and second sense signals supplied from processing circuits 114A and 114B, respectively, change with time. Similarly, the failure detection signal supplied from failure diagnosing circuit 16 changes with time. When the first and second sense signals and the failure detection signal are supplied to output circuit 19, output circuit 19 digitally outputs information on the first and second sense signals, and the failure detection signal corresponding to this information, at each of timings.

In this manner, output circuit 19 digitally outputs the failure detection signal, and the first and second sense signals supplied at the same time point as the failure detection signal, using a time division method. Thus the first and second sense signals can be determined to be the results in a normal state or the results in an abnormal state.

In the example shown in FIG. 6, the determination based on a failure detection signal indicates a "normal" state at a time point $t_{s1}$, but an "abnormal" state at a time point $t_{s2}$. The output of the first and second sense signals that are correlated with the failure detection signal information determined to indicate an abnormal state is handled as "results in an abnormal state". Thus, when the sensor device of this exemplary embodiment is used to control a vehicle, for example, the controller (not shown) of the vehicle determines not to use the first and second sense signals at the time point $t_{s2}$ determined to be "results in an abnormal state". This determination can prevent malfunction of the vehicle resulting from the control of the vehicle that is based on the first and second sense signals supplied at the time point $t_{s2}$.

Such a structure allows a failure detection signal having one-to-one correlation with sense signals to be supplied from output terminal 30 of output circuit 19, without any output terminal provided in failure diagnosing circuit 16. As a result, the sensor device can be downsized.

Also in this exemplary embodiment, the number of sensing elements may be one, and one driving circuit, one detecting circuit, and one processing circuit may be provided as a circuit configuration corresponding to the one sensing element.

For example, only driving circuit 11A, detecting circuit 113A, and processing circuit 114A are provided. In this case, output circuit 19 digitally outputs, using a time division method, a failure detection signal from failure diagnosing circuit 16, and a sense signal from processing circuit 114A supplied at the same time point as the failure detection signal. Thus, the sense signal can be determined to be the results in a normal state or the results in an abnormal state.

Also in this exemplary embodiment, a plurality of failure diagnosing circuits 16 may be provided. Further, each of the plurality of failure diagnosing circuits may be electrically connected to at least one of driving circuits 11A and 11B, detecting circuits 113A and 113B, and processing circuits 114A and 114B. In this case, the output circuit digitally outputs, using a time division method, a plurality of failure detection signals from the plurality of failure diagnosing circuits, and sense signals from processing circuits 114A and 114B. Such a structure can also be implemented. A description is provided of such a structure, with reference to FIG. 7.

Figure 7:
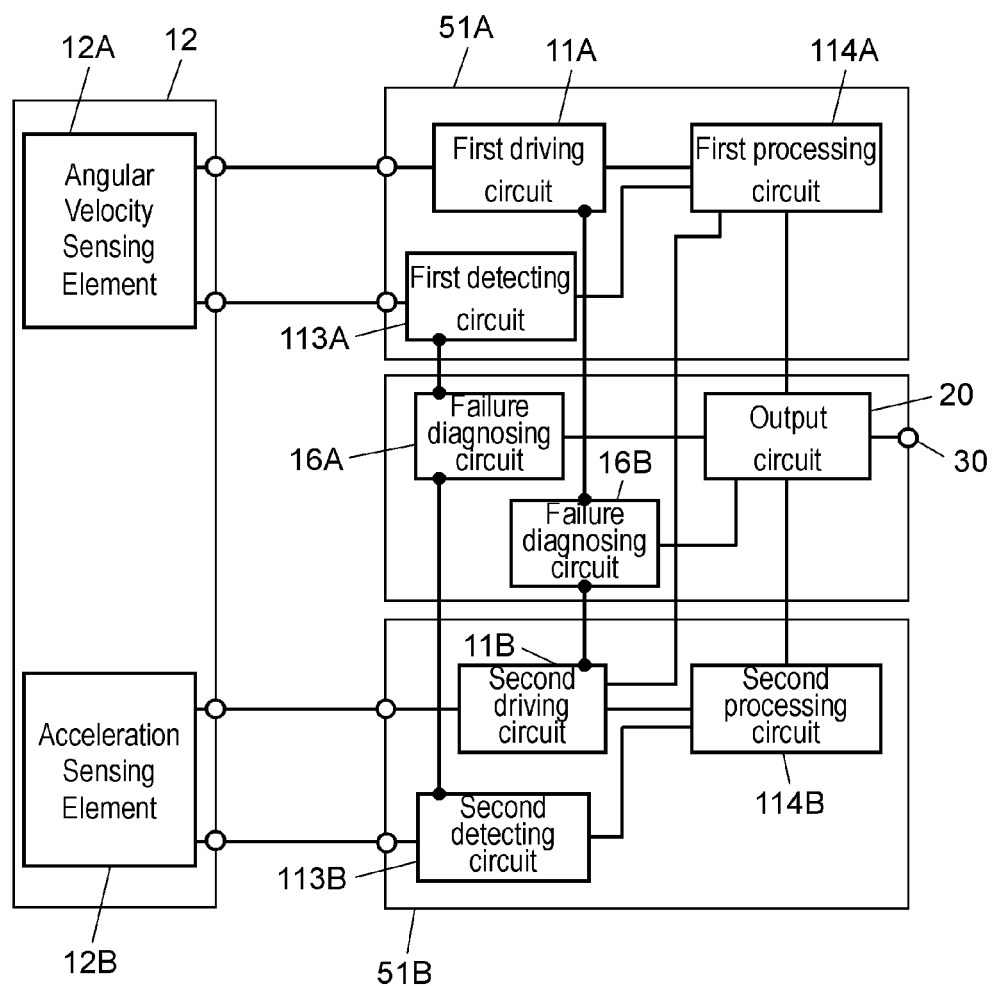
FIG. 7 is a block diagram of another sensor device in accordance with the second exemplary embodiment of the present invention.

FIG. 7 is a block diagram of another sensor device in accordance with the second exemplary embodiment of the present invention.

In this structural example, instead of failure diagnosing circuit 16, first failure diagnosing circuit 16A and second failure diagnosing circuit 16B (hereinafter each referred to as "failure diagnosing circuit") are provided. These failure diagnosing circuits are electrically connected to output circuit 20. Failure diagnosing circuit 16A is electrically connected to detecting circuits 113A and 113B. Failure diagnosing circuit 16B is electrically connected to driving circuits 11A and 11B.

Figure 8:
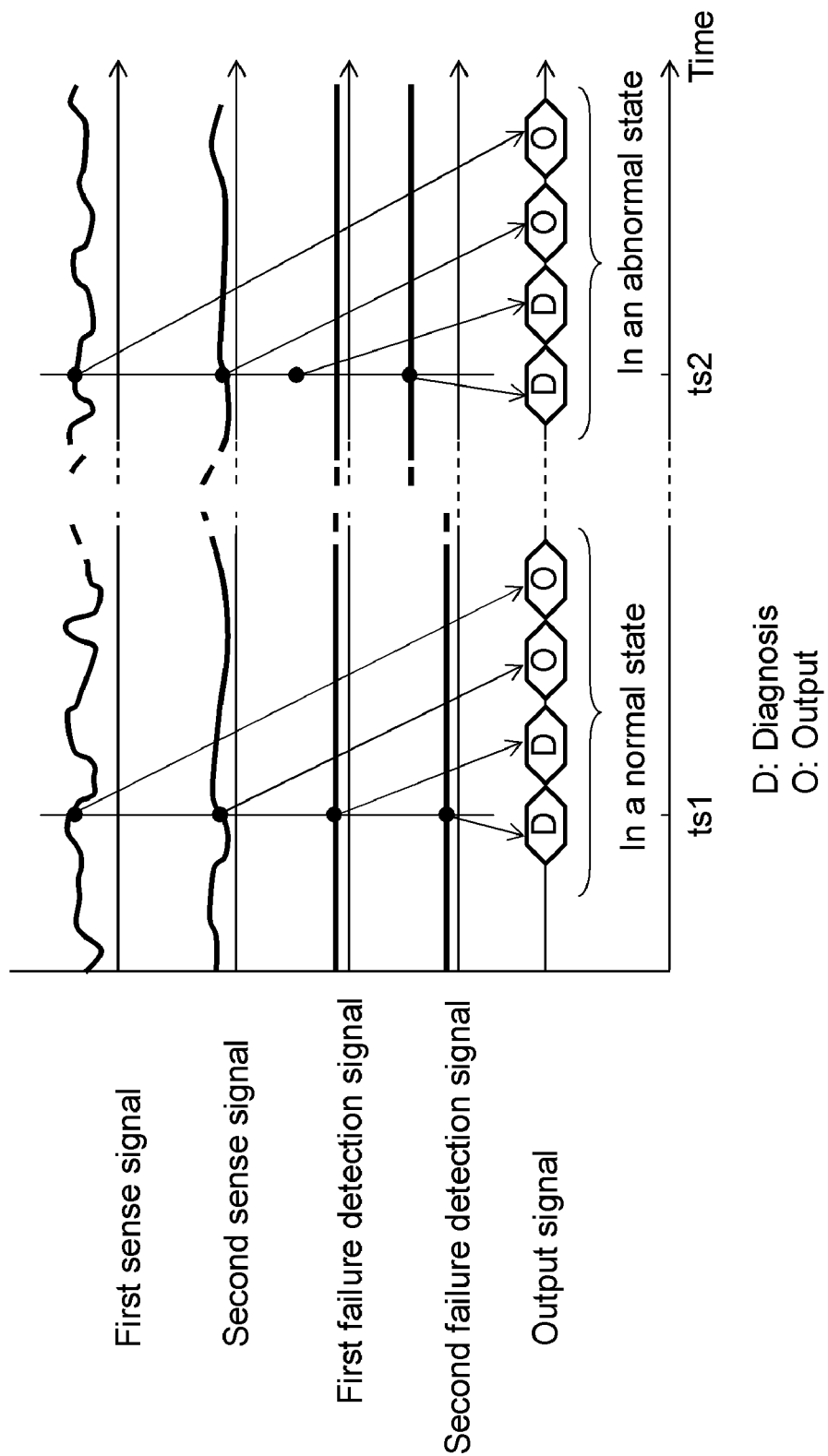
FIG. 8 is a chart showing changes in output signals in the sensor device of FIG. 7.
Figure 9:
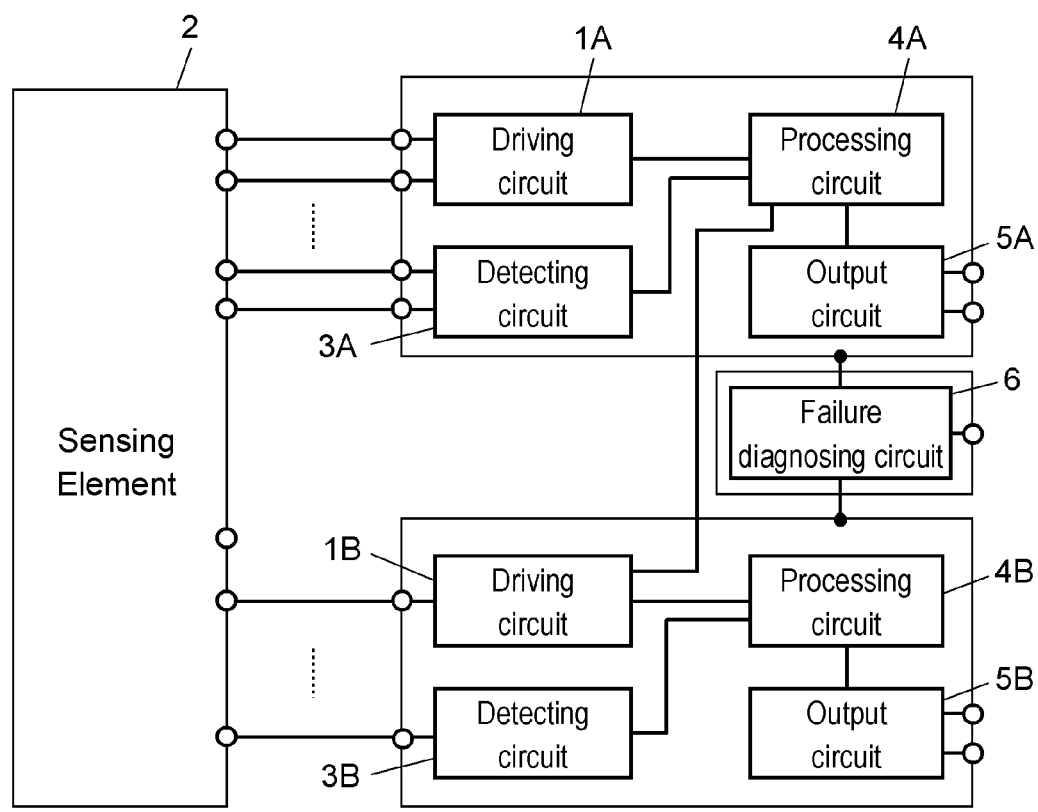
FIG. 9 is a block diagram of a conventional sensor device.

In such a structure, the output signals from output circuit 20 are as shown in FIG. 8. That is, the first and second sense signals supplied from processing circuits 114A and 114B, respectively, change with time. Similarly, a first failure detection signal that is supplied from failure diagnosing circuit 16A electrically connected to detection circuits 113A and 113B also changes with time. A second failure detection signal that is supplied from failure diagnosing circuit 16B electrically connected to driving circuits 11A and 11B also changes with time. The first and second sense signals and the first and second failure detection signals are supplied to output circuit 20. Output circuit 20 digitally outputs, using a time division method, the information on the first and second sense signals, and the information on the first and second failure detection signals corresponding to the information on the first and second sense signals, at each of timings.

In the example shown in FIG. 8, the determination based on the failure detection signals indicates a "normal" state at the time point $t_{s1}$. On the other hand, at the time point $t_{s2}$, the first failure detection signal indicates a normal state, but the second failure detection signal indicates an abnormal state. Thus, the overall determination indicates an "abnormal" state. The output of the first and second sense signals that are correlated with this second failure detection signal information determined to indicate an abnormal state is handled as "results in an abnormal state".

Thus, when the sensor device of this exemplary embodiment is used to control a vehicle, for example, the controller (not shown) of the vehicle determines not to use the first and second sense signals at the time point $t_{s2}$ determined as the "results in an abnormal state". This determination can prevent malfunction of the vehicle resulting from the control of the vehicle that is based on the first and second sense signals at the time point $t_{s2}$.

Such a structure allows a failure detection signal having one-to-one correlation with sense signals to be supplied from output terminal 30 of output circuit 20, without any output terminal provided in failure diagnosing circuits 16A and 16B. As a result, the sensor device can be downsized.

Further, even when a plurality of failure diagnosing circuits 16A and 16B is used, the number of output terminals 30 is not increased in proportion to the number of the failure diagnosing circuits. As a result, the sensor device can be downsized. Further, the use of a plurality of failure diagnosing circuits 16A and 16B increases the number of parts subjected to failure diagnosis, and thus further improves the reliability.

Alternatively, a plurality of failure diagnosing circuits may be provided for a structure in which the number of sensing elements is one, and one driving circuit, one detecting circuit, and one processing circuit are provided as a circuit configuration corresponding to the one sensing element. For example, in the structure shown in FIG. 7, second control circuit 51B and acceleration sensing element 12B may be eliminated. Further, failure diagnosing circuit 16A may be connected to detection circuit 113A, and failure diagnosing circuit 16B may be connected to driving circuit 11A.

In this case, detecting circuit 113A is a first part subjected to failure diagnosis, and driving circuit 11A is a second part subjected to failure diagnosis. Failure diagnosing circuit 16A determines whether detecting circuit 113A is normal or abnormal, and outputs a first failure detection signal based on the determination results. On the other hand, failure diagnosing circuit 16B determines whether driving circuit 11A is normal or abnormal, and outputs a second failure detection signal based on the determination results. Using a time division method, output circuit 20 digitally outputs the first failure detection signal from failure diagnosing circuit 16A, the second failure detection signal from failure diagnosing circuit 16B, and the first sense signal from processing circuit 114A. In this manner, failure diagnosing circuits are provided so as to separately correspond to at least two circuits constituting first control circuit 51A. This structure further improves the reliability of failure diagnosis.

In this exemplary embodiment, unlike the first exemplary embodiment, time point information does not need to be added to a response signal or the like. For this reason, as shown in FIGS. 6 and 8, the sense signals do not need to be digital signals. Thus, parts subjected to failure diagnosis may include driving circuits 11A and 11B, in addition to detecting circuits 113A and 113B, and processing circuits 114A and 114B. These circuits may be analog circuits. It is sufficient that only output circuit 19 (20) for externally outputting signals using a time division method is a digital circuit.

As described above, the sensor device of the present invention has an advantage of having improved reliability, and is useful in various types of electronic devices, such as a digital camera and a car navigation system, and in a vehicle.

What is claimed is:

1. A sensor device comprising:
   a driving circuit configured to output a drive signal;
   a sensing element to which the drive signal from the driving circuit is supplied;
   a detecting circuit configured to extract a response signal from the sensing element;
   a processing circuit configured to extract a sense signal from the response signal from the detecting circuit;
   an output circuit configured to output the sense signal from the processing circuit;
   a failure diagnosing circuit configured to determine whether a part subjected to failure diagnosis is normal or abnormal, the part subjected to failure diagnosis being at least one of the detecting circuit, the processing circuit, and the output circuit, the failure diagnosing circuit being further configured to output a failure detection signal based on results of the determination; and
   a time determining device configured to determine time point information, add the time point information to an output signal related to generation of the failure detection signal, and add the time point information to an output signal related to generation of the sense signal;
   wherein the failure detection signal is correlated with the sense signal, using the time point information.

2. The sensor device according to claim 1, wherein, when the output circuit receives the failure detection signal indicating that the part subjected to failure diagnosis is abnormal from the failure diagnosing circuit, the output circuit does not output the sense signal that has time point information at an identical time point with the time point information of the failure detection signal.

3. A sensor device comprising:
   a driving circuit configured to output a drive signal;
   a sensing element to which the drive signal from the driving circuit is supplied;
   a detecting circuit configured to extract a response signal from the sensing element;
   a processing circuit configured to extract a sense signal from the response signal from the detecting circuit;
   a failure diagnosing circuit configured to determine whether a part subjected to failure diagnosis is normal or abnormal, the part subjected to failure diagnosis being at least one of the detecting circuit, and the processing circuit, the failure diagnosing circuit being further configured to output a failure detection signal based on results of the determination;
   an output circuit configured to output the sense signal from the processing circuit and the failure detection signal from the failure diagnosing circuit, using a time sharing method; and
   a time determining device configured to determine time point information, add the time point information to an output signal related to generation of the failure detection signal, and add the time point information to an output signal related to generation of the sense signal;
   wherein the failure detection signal is correlated with the sense signal, using the time point information.

4. The sensor device according to claim 3, wherein, when the output circuit receives the failure detection signal indicating that the part subjected to failure diagnosis is abnormal from the failure diagnosing circuit, the output circuit does not output the sense signal that has time point information at an identical time point with the time point information of the failure detection signal.

* * * * *

UNITED STATES PATENT AND TRADEMARK OFFICE
CERTIFICATE OF CORRECTION

PATENT NO. : 7,775,109 B2  Page 1 of 1
APPLICATION NO. : 12/615848
DATED : August 17, 2010
INVENTOR(S) : Takeshi Uemura It is certified that error appears in the above-identified patent and that said Letters Patent is hereby corrected as shown below:

On the Title Page,
Please add the following item:
(56) References Cited, Foreign Patent Documents
JP 09-079809  3/1997

Signed and Sealed this

Twenty-sixth Day of October, 2010

David J. Kappos
*Director of the United States Patent and Trademark Office*